United States Patent [19]
White

[11] 3,901,603
[45] Aug. 26, 1975

[54] POLARIMETER AND POLARIMETRIC METHOD

[75] Inventor: Peter G. White, Palos Verdes Peninsula, Calif.

[73] Assignee: TRW Inc., Redondo Beach, Calif.

[22] Filed: Jan. 14, 1974

[21] Appl. No.: 433,026

[52] U.S. Cl. .............................. 356/117; 250/225
[51] Int. Cl.² .......................................... G01J 4/02
[58] Field of Search .................. 356/114, 116, 117; 350/151; 250/225

[56] References Cited
UNITED STATES PATENTS
3,450,477   6/1969   Meltzer ............................. 356/114

Primary Examiner—Ronald L. Wibert
Assistant Examiner—Paul K. Godwin
Attorney, Agent, or Firm—Daniel T. Anderson; Stephen J. Koundakjian; Edwin A. Oser

[57] ABSTRACT

Disclosed is an improved polarimeter and polarimetric method.

The heart of the polarimeter is a Faraday rod within a concentric coil. The light being analyzed is imaged at a field stop, passed through the rod and, subsequently, through an analyzer. Electric current pulsed through the coil according to a prescribed waveform creates a pulsed magnetic field within the rod, causing the plane of polarization of the incoming light to rotate by an amount varying according to the particular current waveform. This, in turn, creates a varying degree of attenuation, by the analyzer, of the plane polarized component of the light. Means are provided for measuring this variation of attenuation, by which measurement the degree and angle of polarization of the incoming light may be determined, as well as the intensity thereof.

8 Claims, 7 Drawing Figures

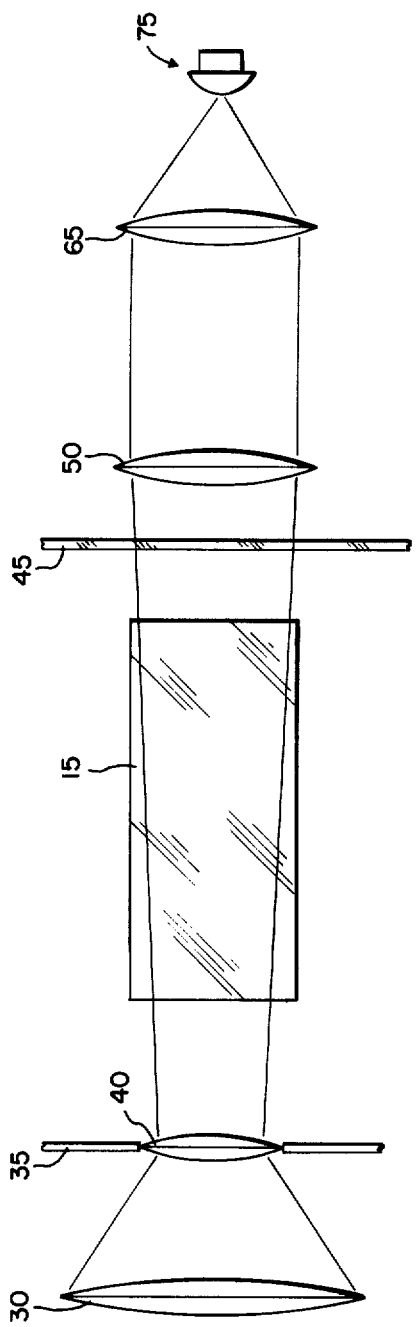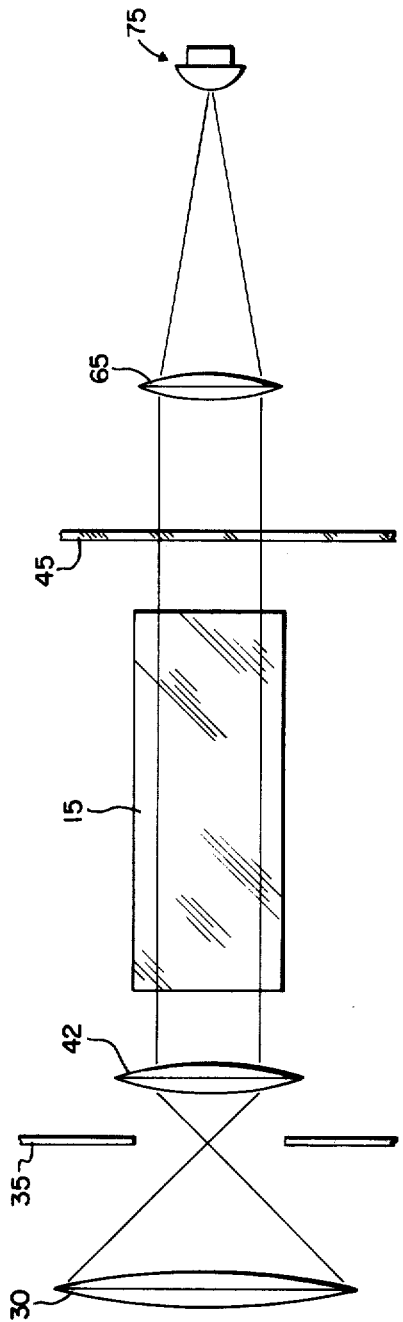

3,901,603

POLARIMETER AND POLARIMETRIC METHOD

BACKGROUND OF THE INVENTION

A. Field of Invention

This invention relates to devices for the measurement of the degree and angle of polarization of light suspected of containing a plane polarized component, and the intensity of the light.

B. Description of Prior Art

Polarimeters have been commonly used for many years.

The heart of a typical polarimeter is a rotatable analyzer disc which has the physical property of blocking out plane polarized light whose polarization plane is perpendicular to the polarization plane of the analyzer, and passing, in a known manner, plane polarized light whose polarization plane is aligned with its polarization plane. If plane polarized light is received by the analyzer, such that the two planes are perpendicular (thus causing light transmission to be blocked), the planes may be aligned simply by rotating the analyzer 90°.

When ordinary reflected light (which typically contains a plane polarized component) is received at the analyzer, 180° rotation of the analyzer will cause the intensity of transmitted light to vary between a peak and a valley separated by a rotation angle of 90°. The peak corresponds to the condition where the polarization plane of the polarized component of the light is aligned with the analyzer's polarization plane, and the valley corresponds to 90° misalignment. By comparing the angle of the polarization plane of the analyzer with respect to an external plane at the instant of peak transmission, one may determine the angle of the plane of polarization of the polarized component of the incoming light with respect to that external plane. By comparing the intensity of transmitted light during peak and valley conditions, one may determine the degree of polarization of the incoming light. By summing the intensity of the transmitted light at peak transmission with that at minimum transmission, the intensity of the incoming beam may be obtained.

Essentially then, these prior art polarimeters comprise optics to image the incoming light onto the analyzer, the analyzer itself, mechanical means to rotate the analyzer, and means to detect the intensity of transmitted light at any given time.

The basic deficiency of such apparatus is that, since the analyzer must be rotated, it must be rotatably mounted and, ordinarily, provided with motive means such as an electric motor to produce the desired rotation. This limits their use in space and similar applications where bearing lubrication is difficult and can cause freeze-up and/or optical contamination. Also, such polarimeters have limited service life, due to the cumulative effects of friction, fatigue and similar intrinsic physical factors resulting from the interaction of their moving parts and adjacent bearing surfaces.

In addition, the power requirement of even a small motor can make an excessive demand on the limited available power in a small spacecraft.

SUMMARY OF THE INVENTION

Accordingly, it is an object of the present invention to provide an improved polarimeter having no moving parts.

Briefly, in the polarimeter of the present invention, the analyzer is tangentially fixed within the instrument. Incoming light is imaged onto and passed through a Faraday rod in such manner as to substantially avoid internal reflection from the walls of the rod. The plane of polarization of the polarized component of the light is caused to rotate during its passage through the rod by means of a longitudinal magnetic field generated by a coil concentric with the rod. The coil is activated by current having a predetermined waveform, typically a series of short pulses. Upon exiting the rod, the transmitted beam passes through the fixed analyzer for subsequent detection. In some embodiments means are provided to spectrally divide this emergent beam in order to determine the angle and degree of polarization of the incoming beam within a plurality of selected wavelength regions.

DESCRIPTION OF THE DRAWING

FIG. 3A is a diagram of the optical path of a light beam through an embodiment of the present invention.

FIG. 3B is a diagram of the optical path of light beam through another embodiment of the present invention.

DETAILED DESCRIPTION OF THE PREFERRED EMBODIMENT

Figure 1:
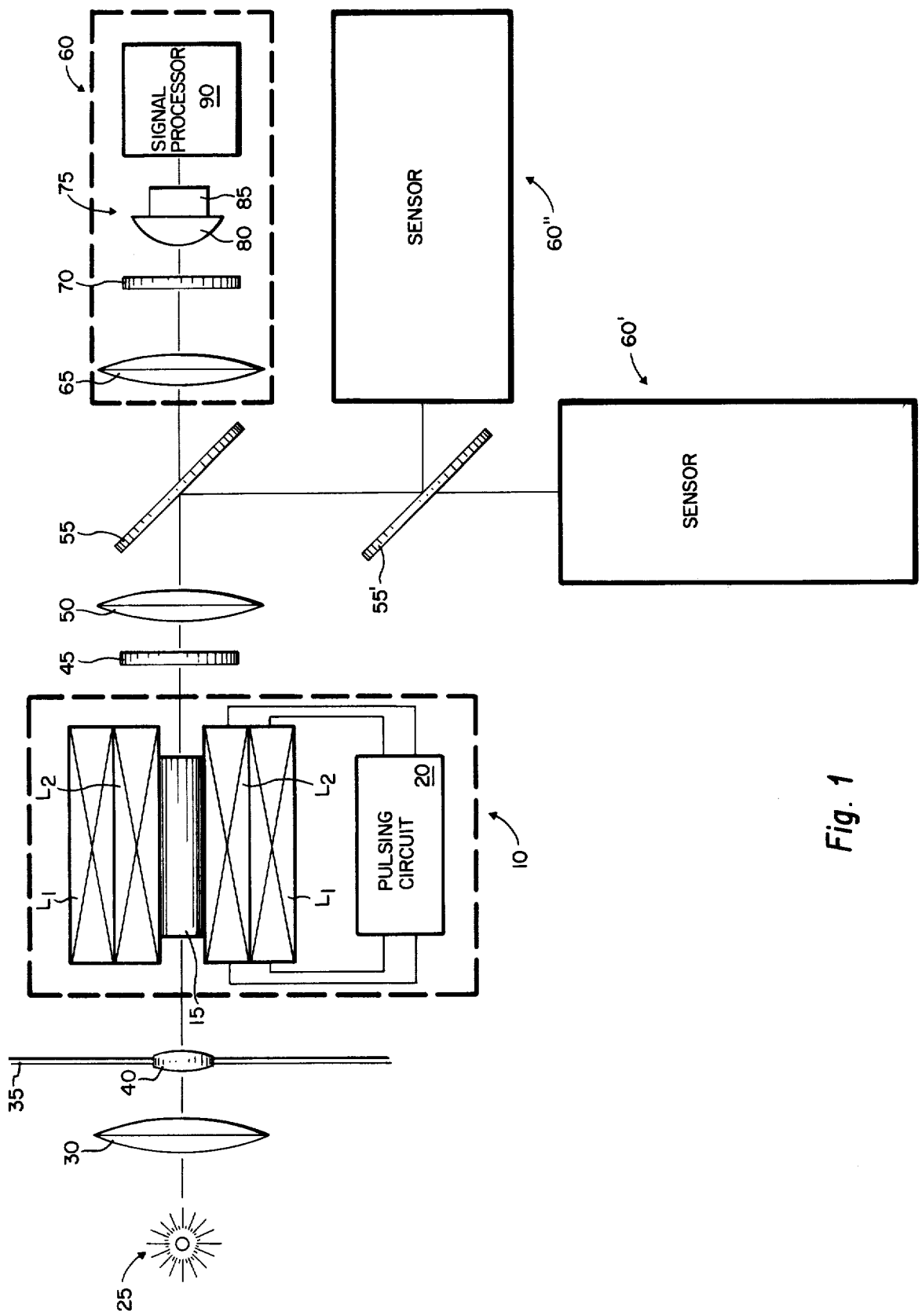
FIG. 1 is a schematic representation of the optics and associated electronics comprising the preferred embodiment of the invention.

The key element of the polarimeter of the present invention is the Faraday rotator 10. In essence, the rotator consists of a Faraday rod 15 surrounded by a first concentric coil $L_1$ which in turn is surrounded by a second concentric coil $L_2$. Activation of the two concentric coils is accomplished by means of a pulsing circuit 20 which will be described in detail below.

The Faraday rod 15 comprises, in essence, a glass cylinder (or other elongated solid structure of suitable material) through which the incoming light source 25 is passed. The principle of operation of the rod is the familiar Faraday magneto-optic effect by which certain materials, under the influence of a longitudinal magnetic field, cause the plane of polarization of incoming plane polarized light to be rotated as the light moves longitudinally through the material. The quality of the material by which the amount of rotation is determined in the Verdet constant, V. The total angular rotation at a given instant of time, $\alpha(t)$, is related linearly to the Verdet constant, the length of the rod, L, and the instantaneous magnetic field strength, $H(t)$, by the equation:

$$(1) \quad \alpha(t) = VLH(t)$$

Many materials, such as ordinary crown or flint glass, exhibit this phenomenon. However, for optimal results, it is desirable to select a material that possesses a particularly high Verdet constant, since such a material can create desired angular rotation of the polarization plane in a relatively short rod with a relatively weak magnetic field. Although the skilled practitioner need only consult the literature in selecting any number of available materials with high Verdet constant, it has been found that terbium alumina silicate, a transparent isotropic medium, yields good results in a polarimeter for use in monitoring reflected visible light from a spacecraft.

Because of the difficulty of maintaining a radially-uniform, longitudinal magnetic field within a rod 15 of relatively large diameter, a rather narrow rod is employed. Since the total rotation of the polarization plane is proportional to the length of the rod, that dimension should exceed the diameter. In the preferred embodiment the approximate dimensions are:

length: 6 cm
diameter: 1.5 cm

Light from the source 25 under analysis is imaged by a conventional objective lens 30 onto a field lens 40 located at a field stop 35. It is preferable that the objective lens be achromatic, although this is not absolutely necessary.

The field lens 40 forms the incoming light into a relatively narrow beam for passage through the Faraday rod 15. Beam formation accomplishes two primary functions. First, it insures that there will be no internal reflection, within the rather narrow rod, which would adversely affect orderly rotation of the polarization plane of the plane polarized component of the light passing through it. Second, it preserves all the incoming light for subsequent high signal-to-noise-ratio detection, without the necessity of large-diameter optical elements.

Of course, a collimating lens 42 may be substituted for the field lens 40, it a collimated beam is desired. Here, the lens is located between the field stop 35 and the rod 15.

Within the constraint imposed by the rather long and narrow Faraday rod 15, a reasonably skilled optical designer may easily adjust the diameters and focal lengths of the objective lens 30 and field lens 40 (or collimating lens 42), the diameter of the field stop 35 and the mutual displacements of these elements and the Faraday rod to provide maximum light gathering (and, therefore, signal-to-noise ratio) within a specified field-of-view.

While passing through the Faraday rod 15, the incoming light is influenced by the magneto-optic effect of the Faraday rotator 10. The longitudinal (i.e., axial) magnetic field which causes the Faraday effect is, in the preferred embodiment, generated by a pair of coils $L_1$, $L_2$ which are mutually concentric and concentric with the rod. In order to insure that, insofar as possible, the magnetic field within the rod is axial and is also radially-uniform within substantially all sections of the rod, the coils are of sufficient length to extend beyond both ends of the rod by about 20% of its length. This greatly reduces the probability that magnetic field edge effects will influence the field within the rod.

There are numerous current waveforms which could be used to activate the Faraday rotator 10.

For example, it could be operated in a "constant field" mode. I.e., the first coil $L_1$ and second coil $L_2$ could each be activated by means of a substantially constant current for a sizeable length of time, perhaps the entire period of operation of the polarimeter. In this mode, the rotation, $\alpha$, would be constant with time.

It could also be actuated by an ordinary sawtooth-wave current. Here, $\alpha(t)$ would vary linearly during each current rise and discontinuously decrease at the termination of each sawtooth.

However, either of these would entail a large power consumption which, in certain applications, such as in connection with satellite used, would be intolerable.

Accordingly, it has been found preferable to briefly and repeatedly pulse the magnetic field by activating the coils $L_1$, $L_2$ by means of a pulsing circuit 20. For reasons which will become apparent in the discussion below, the pulse current waveform should posses sufficient rolloff to create a "ramping" effect — i.e., a continuous increase and/or decrease of current amplitude during at least a portion of the pulse.

Figure 2:
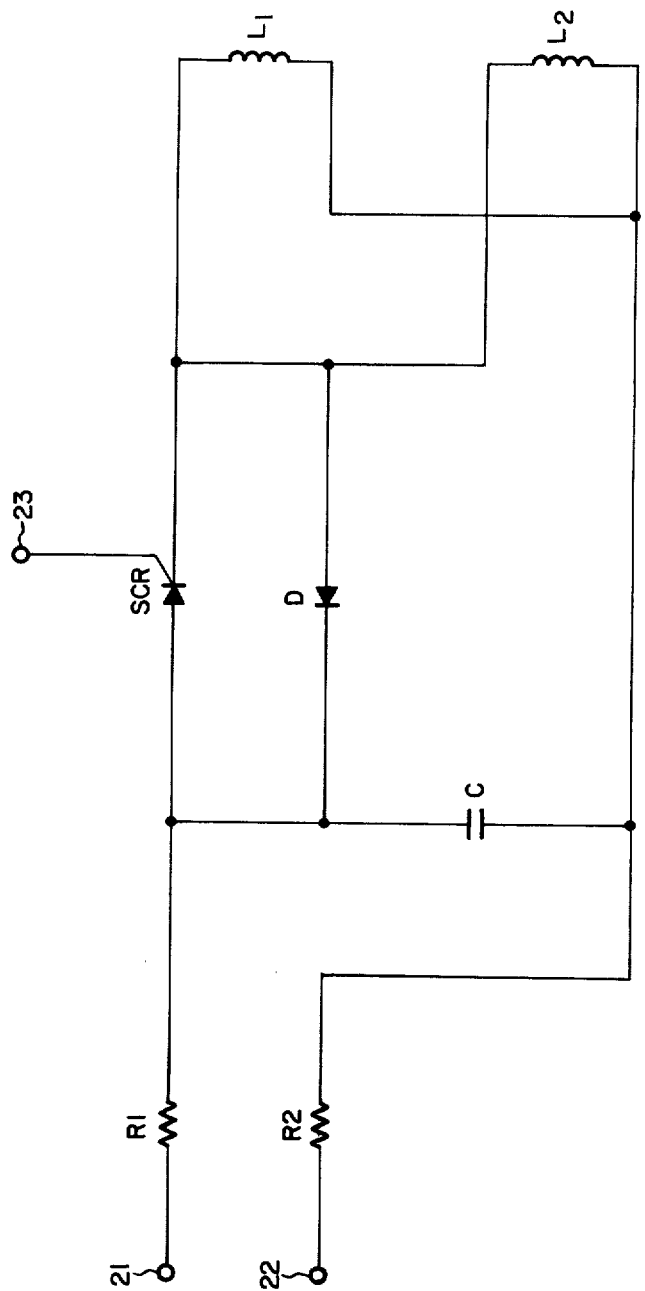
FIG. 2 is an electrical circuit diagram of the pulsing circuit for the Faraday rotator in the preferred embodiment of the invention.

The preferred embodiment of this pulsing circuit 20 is shown in FIG. 2. Here a terminal 21 is connected to a 250 volt DC source while another terminal 22 is connected to a −250 volt DC source. The two resistors, $R_1$ and $R_2$, each have a value of approximately 15,000 ohm. The capacitor, C, has a capacitance of approximately 30 microfarad, while the two coils $L_1$ and $L_2$ each have 82 turns and an inductance value of approximately 34 microhenry. The diode, D, and silicon-controlled rectifier, SCR, are entirely conventional.

Figure 5:
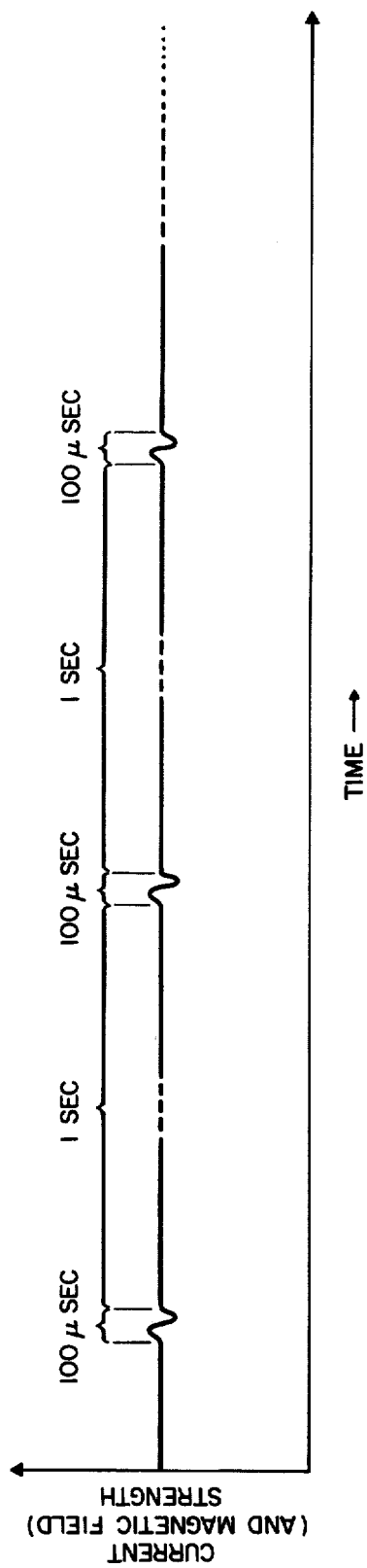
FIG. 5 is a representation of a series of current pulses through the Faraday rotator in the preferred embodiment of the present invention.

The firing command for the SCR may be provided by any conventional timing mechanism, such as a cascaded crystal oscillator, and is fed into terminal 23 at any selected repetition rate. The pulse repetition rate is chosen according to the frequency at which data updating must occur in the particular application for which the polarimeter is used. Normally, in a satellite application where the same target is viewed at different angles, a 1 second interval between updates, as shown in FIG. 5, is sufficient.

Figure 4A:
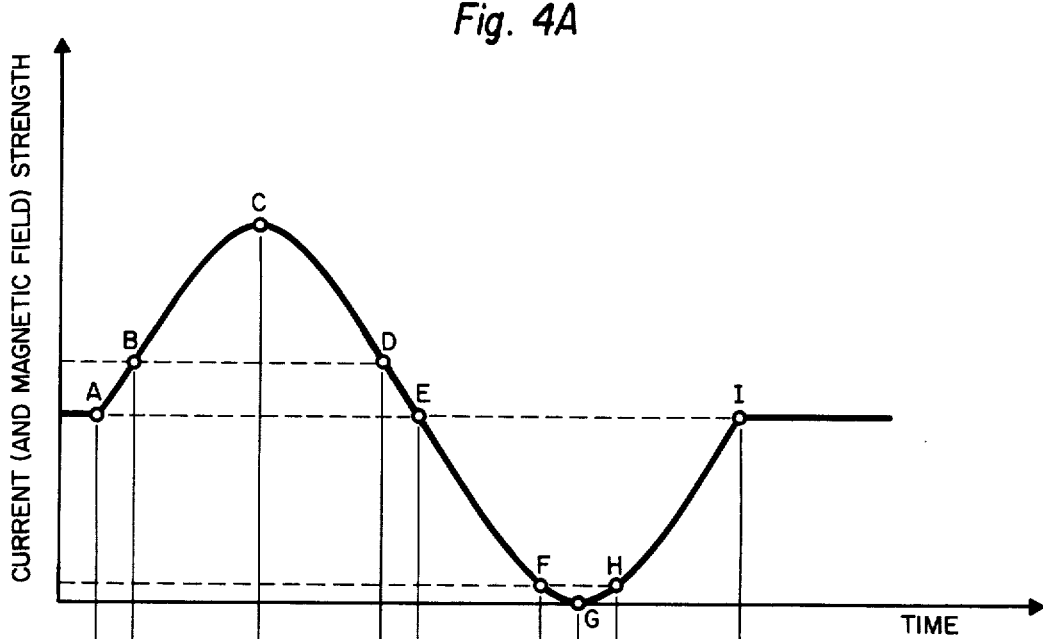
FIG. 4A is a representation of a typical waveform of a current pulse thorugh the coils of the Faraday rotator in the preferred embodiment of the present invention.

The result is a series of current pulses through the coils $L_1$, $L_2$, each of approximately 100 microsecond duration, separated by any desired time interval, perhaps 1 second. The waveform of each pulse (current v. time) is substantially as shown in FIG. 4A. A maximum magnetic field strength of approximately 5,000 gauss is generated during each pulse.

It is, of course, possible to accomplish substantially the same result utilizing a single coil. However, the current amplitude necessary to generate the desired maximum magnetic field strength would cause a greater voltage drop across a single coil then across two coils operated in parallel, as described above. In many applications this additional voltage drop is not significant.

However, in applications, such as in satellite work, where high voltages may present problems (such as arcing), it is desirable to employ a pair of coils wired in parallel, or a single, multiply-wound coil which operates, in effect, as two parallel coils.

If the light entering the Faraday rod 15 is completely unpolarized, passage through the rod will leave it substantially unaffected. However, if the incoming light is plane polarized, its polarization plane will, upon transmission through the rod, be rotated through an angle determined by formula (1) above. If, in the more usual case, the incoming light is a combination of unpolarized and plane polarized light, the plane of polarization of the polarized component will be rotated, while the unpolarized component will be unaffected.

Upon exiting the Faraday rod 15, the light is passed through the analyzer 45. Typically, the analyzer comprises an ordinary sheet polarizer. If desired, a Glan Thompson prism may be used in situations where, because of the particular spectral range of the light being analyzed, one must tolerate its increased weight and limited acceptance angle.

In the ordinary case wherein the analyzer 45 comprises a sheet polarizer, this element is fixed in place within the polarizer with its plane of polarization in a fixed orientation with respect thereto.

The analyzer will substantially extinguish all plane polarized light whose polarization plane is perpendicular to that of the analyzer, and will pass substantially all polarized light whose polarization plane is aligned with that of the analyzer. Unpolarized light will be reduced in intensity in approximately 50%, but this attenuation will be caused merely by the fact that, statistically, the vibration planes of some of the unpolarized light will always be misaligned with the polarization plane of the analyzer; this effect has not relationship with the action of the Faraday rotator 10, and the attenuation factor is substantially constant.

During each current pulse, the strength of the magnetic field operating on the rod 15 will vary with time according to the current waveform, as shown in FIG. 4A. The total angle, α, through which the polarization plane of the plane polarized component of the light is rotated in transit through the rod, will increase and decrease, with time, during each pulse, in conformity to the increases and decreases in the magnetic field strength operating on the rod, according to the relationship in formula (1), above. With the values for the rod 15 and pulsing circuit 20 as given above, the total rotation will vary 90° or more during each pulse.

This means that during each pulse, the light transmitted through the analyzer 45 will experience at least one peak and one valley of intensity, corresponding, respectively, to the instant when the polarization planes are aligned and when they are exactly perpendicular. The valley represents complete blockage of incoming plane polarized light (i.e., passage of 50% of the unpolarized light). The reference intensity level of the light transmitted through the analyzer (i.e., the level when no current flows through the coil $L_1$, $L_2$) is the intensity of the transmitted light, unaffected by the magneto-optic effect of the rotator 10, i.e., 50% of the unpolarized light and some portion of the plane polarized component, the exact attenuation of the latter depending on the angle between the polarization plane of the incoming light and that of the analyzer.

Figure 4B:
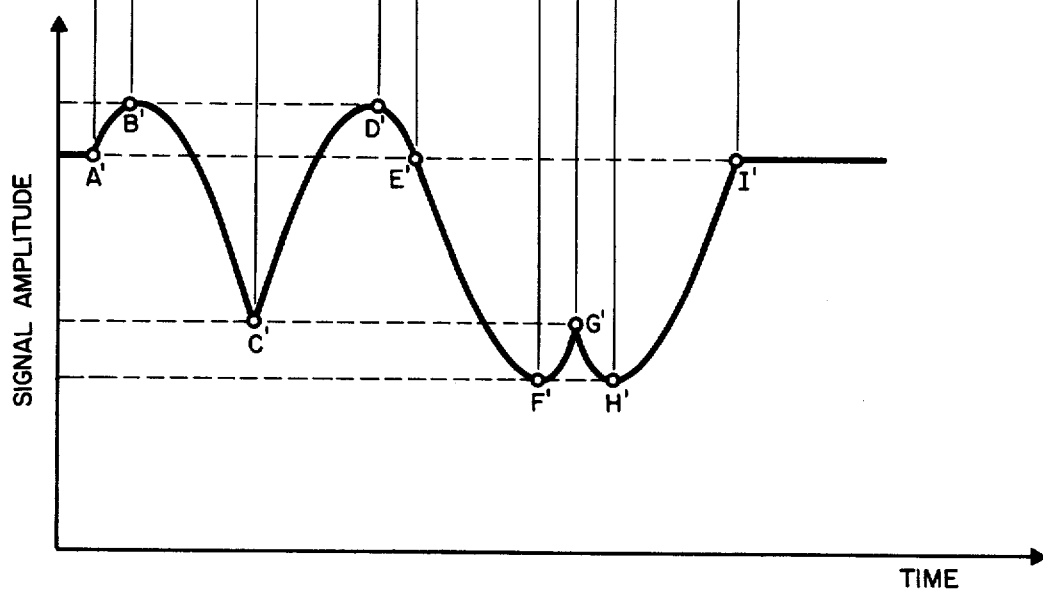
FIG. 4B is a waveform of light intensity versus time for light transmitted through the preferred embodiment of the present invention, during a current pulse having the characteristics shown in FIG. 4A.

With the current waveform shown in FIG. 4A, the intensity of light transmitted through the analyzer 45 will vary with time, during each pulse, substantially as shown in the typical waveform depicted in FIG. 4B. The features of this intensity waveform (indicated with primed letters) have the following significance with respect to the corresponding feature of the related current waveform (indicated with unprimed letters):

Point A, A' — Here, the current pulse begins. The transmitted light intensity has a value somewhere between its maximum and minimum, depending on the orientation of the polarization plane of the incoming plane polarized light with respect to the analyzer polarization plane. In the example shown, the two planes are nearly aligned.

Point B, B' — The current and corresponding magnetic field have reached a sufficiently positive level to cause the plane of the incoming light to rotate within the rod 15 by the amount necessary to create alignment with the analyzer plane. This is a position of peak transmitted intensity.

Point C, C' — The current and field are now at a maximum, but the plane of the incoming light has been rotated beyond the position of alignment. Thus, the transmitted light intensity has decreased.

Point D, D' — The current and field have now decreased to the point where the two polarization planes are again aligned. This represents another intensity maximum.

Point E, E' — The current and field have reached a zero value, and their polarities become negative. The polarization plane of the transmitted light has been returned to that of the incoming light — i.e., the reference orientation.

Point F, F' — The negative current and field are now sufficiently strong to cause the plane of the light to rotate to a position of exact misalignment with the analyzer plane. This is a position of minimum intensity.

Point G, G' — The current and field are at a minimum (actually, a "negative maximum"), and the light plane has been rotated beyond the position of exact misalignment. The current strength now begins to return to zero.

Point H, H' — The negative current and field strength have returned to the point where the plane of the transmitted light is again exactly misaligned with the analyzer plane.

Point I, I' — The current and magnetic field have returned to zero. The rotation of the light plane has ceased. The pulse is complete.

The remaining elements of the polarimeter of the preferred embodiment of the present invention are concerned with detection and analysis of the light transmitted through the analyzer 45. These elements fall into four basic categroies — means for detecting the instantaneous intensity of the transmitted light; means for imaging the transmitted light onto the detecting means; means for analyzing the output from the intensity detecting means; and, if desired, means for spectral separation of the transmitted light prior to intensity detection. The first three of these are collectively referred to as a "sensor" 60.

As shown in FIGS. 3A and 3B (wherein the mutual displacements of the elements are exaggerated for clarity), there are at least two convenient ways to image the transmitted light beam onto the detector(s) 75. In the system shown in FIG. 3A, the objective lens 30 collects the incoming rays and directs them onto the field lens 40, located at a field stop 35. The field lens forms them into a relatively narrow beam for transmission through the Faraday rod 15 and analyzer 45. The transfer lens 50 narrows the beam, which is directed to the condensing lens 65, which images it onto the detector 75.

In the system shown in FIG. 3B, the objective lens 30 directs the rays onto a collimating lens 42, through the field stop 35. The collimating lens causes the beam to pass through the Faraday rod and on through the analyzer 45. The condensing lens 65 images the collimated beam onto the detector 75. This embodiment is preferred if the field of view of the instrument is very small.

The detector 75 is entirely conventional and may be readily selected by the ordinarily skilled practitioner in accordance with the particular wavelengths of light being detected, and other operating parameters dictated by the particular application for the polarimeter. It should be of sufficiently low time constant so as not to distort the waveform of the detected light. In the preferred embodiment of the present invention, where visible reflected light is being analyzed, this device is simply a conventional silicon photodiode 85 located behind an immersion lens 80 of high refraction index optical glass. For infrared applications a germanium immersion lens could be employed.

The signal processor 90 which receives and processes the detector output is, again, rather conventional. Its ultimate purpose is to electronically process the signal from the detector for visual display or analysis.

The particular amplification circuit and associated electronics required to amplify and process the detector signal need not be discussed in detail since they will be entirely familiar to those skilled in the detector art. Typically, a preamplifier appropriate to the detector is used in conjunction with a separate amplifier.

The remainder of the signal processor 90 comprises means for preparation of the final data signal for analysis to obtain the ultimate values desired, i.e., the angle and degree of polarization of the incoming light.

Three examples of such means will be briefly described, the details of their implementation being well within the skill of the ordinary practitioner.

The simplest of the three embodiments comprises an ordinary cathode ray oscilliscope whose vertical deflection is governed by the instantaneous light intensity (i.e. the instantaneous detector signal amplitude). The horizontal sweep is made to correspond to the "expanded" duration of each pulse — i.e., the duration of the sweep is slightly greater than the duration of each pulse, the beginning of each sweep is triggered by the beginning of each new pulse (i.e., any change in amplitude from the DC level) and terminated an instant beyond the return to DC level so that the DC level itself may be seen. The image is held on the CRO screen until the next sweep is initiated. Once the sweep rate and synchronization have been properly adjusted, the CRO screen will continue to display each succeeding data pulse from the detector. The waveform will represent the changes of intensity, during that pulse of the light passing through the analyzer, as the polarization plane of its plane polarized component is rotated by a varying angle by means of the Faraday rotator 10.

The operator need only photograph the image instantaneously displayed on the CRO screen for later data reduction and analysis, according to the formulas given below.

A second embodiment comprises use of a circuit containing low-drift peak and valley detectors to detect and hold the maximum and the minimum signal amplitude within each pulse, together with means to record or display these values. The peak and valley detectors are, of course, reset between pulses. A conventional DC measuring device, such as a DC volt meter, is also provided to obtain the DC signal level between pulses.

In a third embodiment, the detector signal is simply digitized, the digital values being processed in a computer and/or recorded on magnetic tape for later presentation and/or processing.

All of the foregoing and other completely conventional means may be employed by the skilled practitioner in obtaining data representative of the pulse waveform for use in calculating the degree and angle of polarization of light under analysis by means of the polarimeter of the present invention.

Referring now to the output waveform shown in FIG. 4B, we define the following quantities:

$S_{max}$ = the signal corresponding to the maximum transmitted light intensity during a given pulse = all the plane polarized component and one-half of the unpolarized component;

$S_{min}$ = the signal corresponding to the minimum transmitted light intensity during that pulse = one-half of the unpolarized component;

$I$ = the total intensity of the incoming light;

$I_o$ = DC level of the transmitted light intensity — i.e., the intensity corresponding to the condition wherein the Faraday rotator 10 is not activated = one-half of the unpolarized component and a portion of the plane polarized component = the signal value between pulses multiplied by $R\tau$;

$I_p$ = the intensity of the plane polarized component of the incoming light = the difference in intensity of the transmitted light between the peak condition (corresponding to alignment between the polarization plane of the transmitted light and of the analyzer) and the valley condition (corresponding to 90° misalignment);

$I_u$ = the intensity of the unpolarized component of the incoming light which would have been transmitted if the analyzer were absent = twice the intensity of the unpolarized component which is, in fact, transmitted through the analyzer;

$P$ = the degree of polarization of the incoming light;

$R$ = the transfer function of the instrument (radiance per volt)

$\tau$ = the optical transmission efficiency of the instrument;

$\beta$ = the angle that the plane of polarization of the incoming light makes with respect to some fixed axis; and $\theta$ = the angle between that fixed axis and the polarization plane of the analyzer;

With these quantities so defined, $$(2) \quad P = \frac{S_{max} - S_{min}}{S_{max} + S_{min}};$$

(3) $I = \tau R(S_{max} + S_{min})$;

(4) $I_u = 2\tau R S_{min}$; and (5) $I_p = \tau R(S_{max} - S_{min})$ by definition, and It can be shown that:

$$(6) \quad \cos^2(\beta - \theta) = \frac{I_o - \frac{I_u}{2}}{I_p}$$

The final element of the overall system comprises means for spectral separation. This element of the polarimeter is optional and may be incorporated wherever it is desired to instantaneously analyze the polarization aspects of the incoming light in more than one spectral region.

FIG. 1 illustrates a system wherein such analysis is accomplished simultaneously in three bandwidths. Here, a conventional dichroic beamsplitter 55 is aligned so that the light transmitted through the analyzer 45 is divided into two beams of differing wavelengths. One of these transmitted directly through the dichroic beamsplitter into the sensor 60, comprising a condensing lens 65, and interference filter 70, a detector 75 (comprising an immersion lens 80 and a photodiode 85) and a signal processor 90 controlling and responsive to the output of said detector. The second portion is reflected by the dichroic beamsplitter onto a second dichroic beamsplitter 55'. One spectral portion of this reflected beam is transmitted directly through the second beamsplitter to a second sensor 60', substantially identical to the first sensor 60. The final spectral portion is reflected from the second beamsplitter into a third sensor 60'', which is, again, substantially identical to the first sensor 60.

Within a given one of the sensors 60, 60' and/or 60'', an interference filter 70 intervenes between the condensing lens 65 and the detector 75. The purpose of this interference filter is to further define the wavelengths of transmitted light to be further processed by the particular light processor.

Those skilled in the pertinent art will undoubtedly be able to select the combination of dichroic beamsplitters 55, 55', interference filters 70 and detectors 75 to produce a polarimeter according to the present invention which is capable of separately and simultaneously investigating the angle and degree of polarization of incoming light within any reasonable number of spectral regions of any desired widths and center wavelengths. For some applications the practitioner may choose to eliminate the use of the interference filter and/or to substitute, for the dichroic beamsplitters, themselves, some other spectal separation device(s) such as prisms or gratings or some combination thereof. Such devices are entirely conventional and their selection and incorporation into the polarimeter of the present invention is not essential to the inventive concept disclosed herein.

I claim:

1. A polarimeter, for measuring the degree and angle of polarization of light from a remote source comprising:

means to form a quantity of ambient light originating at the remote source into a beam;

means for receiving the beam, said receiving means including magneto-optic means to cause the plane of polarization of the plane polarized component of the light to rotate, said magneto-optic means providing an exit for the beam, said magneto-optic means comprising:

a Faraday rod;

a coil operably positioned with respect to said rod so that upon passage of electric current therethrough, a longitudinal magnetic field is created within said rod; and means to selectively provide an electric current input to said coil, said current provision means and said coil being mutually adapted to create, within said rod, a magnetic field whose amplitude waveform comprises a series of pulses, wherein said pulses are mutually separated by an average time interval greater than the average individual duration thereof;

a single polarization analyzer means adapted to receive the beam exiting said magneto-optic means, said analyzer means having a polarization plane substantially fixed within said polarimeter during operation thereof, said analyzer being adapted to selectively pass portions of the beam, the selectivity depending at least in part on the mutual orientation of the polarization plane of the analyzer and that of the received light; and electro-optic sensing means to sense the instantaneous intensity of the beam passed by said analyzer.

2. Polarimeter as recited in claim 1, wherein the ratio of average time interval to average individual duration is at least 1000.

3. Polarimeter as recited in claim 1, wherein said pulses are ramped.

4. A polarimeter, comprising:

means to form a quantity of ambient light originating at a remote source into a beam;

means for receiving the beam, said receiving means including magneto-optic means to cause the plane of polarization of the plane polarized component of the light to rotate, said magneto-optic means providing an exit for the beam, said magneto-optic means comprising:

a Faraday rod;

a coil operably positioned with respect to said rod so that upon passage of electric current therethrough, a longitudinal magnetic field is created within said rod; and means to selectively provide an electric current input to said coil;

polarization analyzer means adapted to receive the beam exiting said magneto-optic means, said analyzer means having a polarization plane substantially fixed within said polarimeter during operation thereof, said analyzer being adapted to selectively pass portions of the beam, the selectivity depending at least in part on the mutual orientation of the polarization plane of the analyzer and that of the received light;

electro-optic sensing means to sense the instantaneous intensity of the beam passed by said analyzer; and spectral separation means for dividing the passed beam into a plurality of beams of selected wavelengths said sensing means adapted to individually sense each of the divided beams.

5. Polarimeter as recited in claim 4, wherein said separation means comprises at least one dichroic beamsplitter, and said sensor means comprises a plurality of individual elements, each of said elements adapted to sense a single one of the divided beams.

6. A polarimeter, comprising:

means to form a quantity of ambient light originating at a remote source into a beam;

means for receiving the beam, said receiving means including magneto-optic means to cause the plane of polarization of the plane polarized component of the light to rotate, said magneto-optic means comprising:

a Faraday rod;

a coil operably positioned with respect to said rod so that upon passage of electric current therethrough, a longitudinal magnetic field is created within said rod; and means to selectively provide an electric current input to said coil;

polarization analyzer means adapted to receive the beam exiting said magneto-optic means, said analyzer means having a polarization plane substantially fixed within said polarimeter during operation thereof, said analyzer being adapted to selectively pass portions of the beam, the selectivity depending at least in part on the mutual orientation of the polarization plane of the analyzer and that of the received light;

electro-optic sensing means to sense the instantaneous intensity of the beam passed by said analyzer, said sensing means comprising a photodetector having means to output an electric signal corresponding to the instantaneous intensity of the sensed beam; and means to electrically process the signal, said processing means comprising means to digitize the signal.

7. A polarimeter, comprising:

means to form a quantity of ambient light originating at a remote source into a beam;

means for receiving the beam, said receiving means including magneto-optic means to cause the plane of polarization of the plane polarized component of the light to rotate, said magneto-optic means providing an exit for the beam, said magneto-optic means comprising:

a Faraday rod;

a coil operably positioned with respect to said rod so that upon passage of electric current therethrough, a longitudinal magnetic field is created within said rod; and means to selectively provide an electric current input to said coil;

polarization analyzer means adapted to receive the beam exiting said magneto-optic means, said analyzer means having a polarization plane substantially fixed within said polarimeter during operation thereof, said analyzer being adapted to selectively pass portions of the beam, the selectivity depending at least in part on the mutual orientation of the polarization plane of the analyzer and that of the received light;

electro-optic sensing means to sense the instantaneous intensity of the beam passed by said analyzer, said sensing means comprising a photodetector having means to output an electric signal corresponding to the instantaneous intensity of the sensed beam; and means to electrically process the signal, said processing means comprising means to selectively visually display the signal.

8. A polarimeter, comprising:

means to form a quantity of ambient light originating at a remote source into a beam;

means for receiving the beam, said receiving means including magneto-optic means to cause the plane of polarization of the plane polarized component of the light to rotate, said magneto-optic means providing an exit for the beam, said magneto-optic means comprising:

a Faraday rod;

a coil operably positioned with respect to said rod so that upon passage of electric current therethrough, a longitudinal magnetic field is created within said rod; and means to selectively provide an electric current input to said coil;

polarization analyzer means adapted to receive the beam exiting said magneto-optic means, said analyzer means having a polarization plane substantially fixed within said polarimeter during operation thereof, said analyzer being adapted to selectively pass portions of the beam, the selectivity depending at least in part on the mutual orientation of the polarization plane of the analyzer and that of the received light;

electro-optic sensing means to sense the instantaneous intensity of the beam passed by said analyzer, said sensing means comprising a photodetector having means to output an electric signal corresponding to the instantaneous intensity of the sensed beam; and means to electrically process the signal, said processing means comprising electrical circuitry means to detect local amplitude peaks within the signal.

* * * * *

UNITED STATES PATENT AND TRADEMARK OFFICE
CERTIFICATE OF CORRECTION

PATENT NO. : 3,901,603
DATED : August 26, 1975
INVENTOR(S) : Peter G. White

It is certified that error appears in the above-identified patent and that said Letters Patent are hereby corrected as shown below:

Column 2, line 26, after "path of" insert -- a --.
         line 50, after "light" insert --from the light--.
         line 58, delete "in" and insert --is--.
Column 3, line 37, delete "it" and insert --if--.
Column 4, line 9, delete "used" and insert --use--.
         line 14, delete "posses" and insert --possess--.
         line 36, after "updates" delete " , as shown".
         line 37, delete "in FIG. 5,".
         line 38, after "is" insert -- , as shown in FIG. 5, --.
Column 5, line 17, after "intensity" delete "in" and insert --by--
Column 9, line 4, after "these" insert --is--.

Signed and Sealed this twenty-ninth Day of June 1976

[SEAL]

Attest:

RUTH C. MASON
Attesting Officer

C. MARSHALL DANN
Commissioner of Patents and Trademarks